(12) United States Patent
Wang

(10) Patent No.: US 11,617,108 B2
(45) Date of Patent: Mar. 28, 2023

(54) FACILITATING A TRANSMISSION POWER DEPENDENT RESOURCE RESERVATION PROTOCOL IN ADVANCED NETWORKS

(71) Applicant: AT&T Intellectual Property I, L.P., Atlanta, GA (US)

(72) Inventor: Xiaoyi Wang, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 16/907,756

(22) Filed: Jun. 22, 2020

(65) Prior Publication Data
US 2021/0400539 A1 Dec. 23, 2021

(51) Int. Cl.
| | |
|---|---|
| H04W 28/26 | (2009.01) |
| H04W 72/04 | (2009.01) |
| G06N 20/00 | (2019.01) |
| H04W 52/48 | (2009.01) |
| H04W 52/34 | (2009.01) |
| H04W 52/50 | (2009.01) |

(52) U.S. Cl.
CPC ............ *H04W 28/26* (2013.01); *G06N 20/00* (2019.01); *H04W 52/343* (2013.01); *H04W 52/48* (2013.01); *H04W 52/50* (2013.01); *H04W 72/048* (2013.01)

(58) Field of Classification Search
CPC ..... H04W 28/00; H04W 28/26; H04W 52/48; H04W 52/50; H04W 72/00; H04W 72/048
See application file for complete search history.

(56) References Cited

U.S. PATENT DOCUMENTS

| | | | |
|---|---|---|---|
| 2004/0037238 A1 | 2/2004 | Schiff et al. | |
| 2016/0338078 A1* | 11/2016 | Wang | H04W 72/10 |
| 2018/0220379 A1* | 8/2018 | Zhang | H04W 52/36 |
| 2018/0242264 A1 | 8/2018 | Pelletier et al. | |
| 2021/0014873 A1* | 1/2021 | Akhtar | H04W 72/1215 |
| 2021/0314796 A1* | 10/2021 | Hoang | H04W 72/02 |
| 2021/0392547 A1* | 12/2021 | Tang | H04W 28/16 |

OTHER PUBLICATIONS

Notice of Allowance received for U.S. Appl. No. 16/827,076 dated Apr. 20, 2022, 25 pages.
Non-Final Office Action received for U.S. Appl. No. 16/827,076 dated Jan. 6, 2022, 31 pages.

* cited by examiner

*Primary Examiner* — Jinsong Hu
*Assistant Examiner* — Farideh Madani
(74) *Attorney, Agent, or Firm* — Amin, Turocy & Watson, LLP

(57) ABSTRACT

Facilitating a transmission power dependent resource reservation protocol in advanced networks (e.g., 5G, 6G, and beyond) is provided herein. Operations of a method can comprise defining, by a system comprising a memory and a processor, a resource reservation procedure that associates respective amounts of reserved resources available for the mobile device based on a transmission power level of the mobile device. The method also can comprise selecting, by the system, an amount of reserved resources from the respective amounts of reserved resources available based on the transmission power level of the mobile device.

20 Claims, 10 Drawing Sheets

| Tx power 202 | Maximal reserved resource 204 | Length of reservation per signaling 206 |
|---|---|---|
| Max Tx power | 5% | 50ms |
| Max Tx power − 3dB | 10% | 100ms |
| Max Tx power − 6dB | 20% | 100ms |
| Max Tx power − 9dB | 30% | 200ms |

FIG. 2

FACILITATING A TRANSMISSION POWER DEPENDENT RESOURCE RESERVATION PROTOCOL IN ADVANCED NETWORKS

TECHNICAL FIELD

This disclosure relates generally to enabling vehicle to everything (V2X) services in Fifth Generation (5G) or other advanced networks and, more specifically, to a smart resource reservation protocol that limits the amount of reserved resources according to a transmission power.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which:

FIG. 2 illustrates an example, non-limiting, first resource reservation data structure in accordance with one or more embodiments described herein;

DETAILED DESCRIPTION

Figure 1:
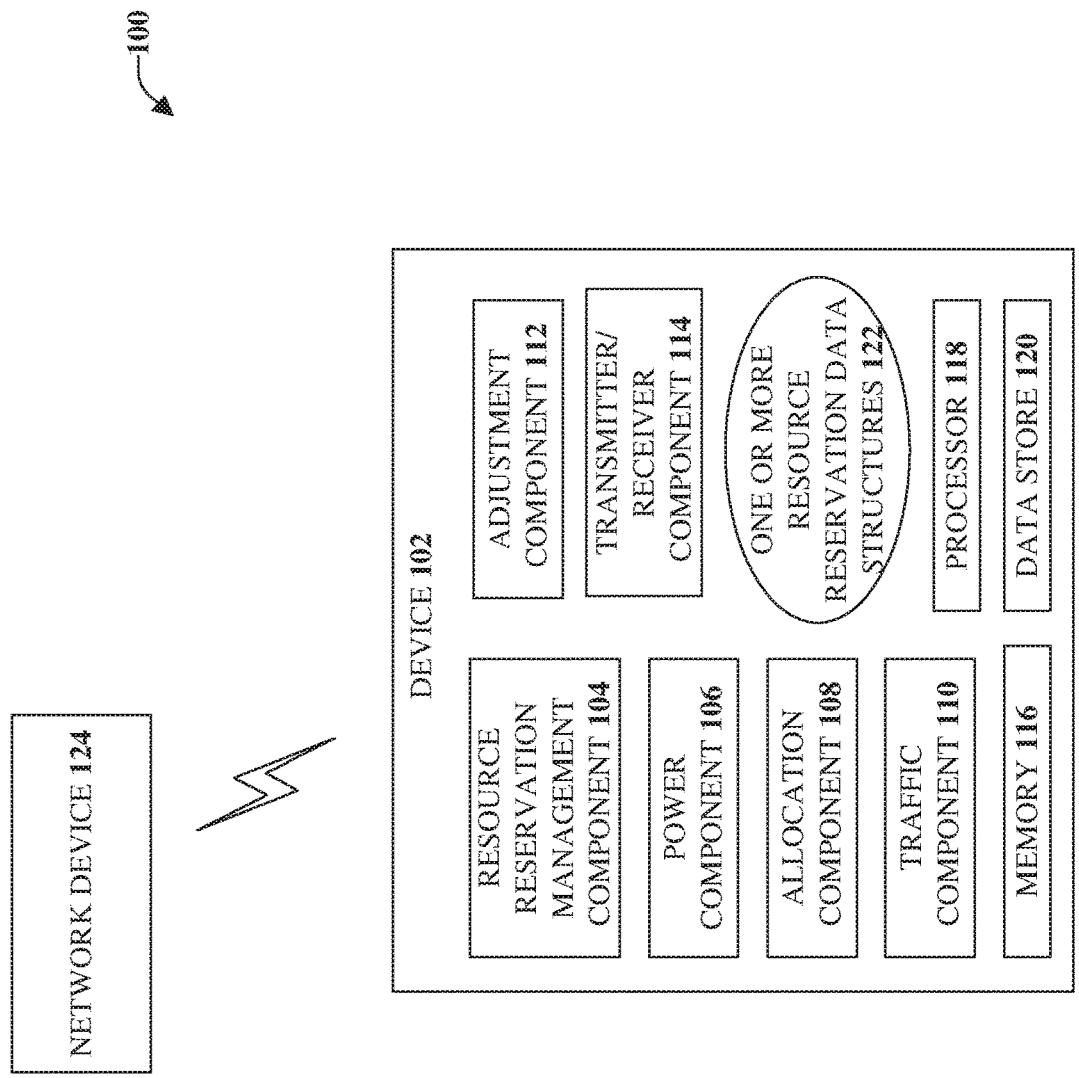
FIG. 1 illustrates an example, non-limiting, system that facilitates a transmission power dependent resource reservation protocol in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate a transmission power dependent resource reservation protocol. For example, the various aspects can enable vehicle to everything (V2X) services in 5G New Radio (NR) networks and/or other advanced networks. More specifically, the various aspects provide a smart resource reservation protocol that limits the amount of reserved resources according to the transmission power. The disclosed aspects can be applied to a peer-to-peer or mesh network.

A resource reservation protocol can be enabled to coordinate the resource usage of different User Equipment (UE) devices in a certain geographic area. The principle of reservation is to allow a UE device to reserve resources in the future to facilitate periodic traffic or remaining data in the buffer. The reservation signaling is broadcasted out and to be received by all surrounding UE devices. Other UE devices will respect the reservation and find other resources to use.

The reserved resources can be used for initial transmission and/or Hybrid Automatic Repeat Request (HARQ) retransmission. That means, UE devices tend to be greedy in the sense that the UE device will reserve more resources than it needs to ensure a better Quality of Service (QoS). However, greedier UE devices mean the system overall load will be unnecessarily higher. To this and related ends, provided is a protocol to limit the greediness of one or more UE devices to reserve more resources.

According to an embodiment is a method that can comprise defining, by a system comprising a memory and a processor, a resource reservation procedure that associates respective amounts of reserved resources available for the mobile device based on a transmission power level of the mobile device. The method also can comprise selecting, by the system, an amount of reserved resources from the respective amounts of reserved resources available based on the transmission power level of the mobile device.

In an example, defining the resource reservation procedure can comprise allocating a first amount of reserved resources based on the transmission power level of the mobile device being determined to be at a maximum transmission power capability of the mobile device. Further, defining the resource reservation procedure can comprise allocating a second amount of reserved resources based on the transmission power level of the mobile device being determined to be a defined value lower than the maximum transmission power capability of the mobile device. The second amount of reserved resources can be greater than the first amount of reserved resources.

Further to the above example, defining the resource reservation procedure further can comprise defining a length of a reservation period per signaling based on the transmission power level of the mobile device. In addition to the above example, defining the length of the reservation period can comprise defining a first length of the reservation period based on the transmission power level determined to be at the maximum transmission power capability of the mobile device. Further, defining the length of the reservation period can comprise defining a second length of the reservation period based on the transmission power level being determined to be a second defined percentage lower than the maximum transmission power capability of the mobile device. The second length of the reservation period can be longer than the first length of the reservation period.

The reserved resources can be used for hybrid automatic repeat request retransmission by the mobile device. Alternatively, or additionally, the reserved resources can be used for initial transmission by the mobile device.

According to some implementations, the method can comprise determining, by the system, an amount of network traffic within a communications network. The method also can comprise defining, by the system, a second resource reservation procedure based on the amount of network traffic being above a defined network traffic level. Further to these implementations, the second resource reservation procedure can comprise fewer reserved resources being available for the mobile device as compared to the first resource reservation procedure.

Further to the above implementations, defining the second resource reservation procedure can comprise defining a first length of a first reservation period per signaling based on the transmission power level of the mobile device. The first length of the first reservation period of the second resource reservation procedure is shorter than a second length of a second reservation period of the first resource reservation procedure.

Alternatively, or additionally, defining the second resource reservation procedure can comprise disabling a reservation of resources based on the transmission power level of the mobile device being a maximum transmission power level of the mobile device.

In accordance with some implementations, the method can comprise mitigating, by the system, an amount of network traffic congestion in a communications network. The mitigation can comprise controlling an effectiveness of the amount of reserved resources based on defining the resource reservation procedure.

Another embodiment provided herein relates to a system that can comprise a processor and a memory that stores executable instructions that, when executed by the processor, facilitate performance of operations. The operations can comprise configuring a user equipment device with a resource reservation data structure. The operations also can comprise controlling an amount of resources available for reservation by the user equipment device based on a transmission power level of the user equipment device during a reservation signaling duration and based on the resource reservation data structure.

In an example, the resource reservation data structure maps a transmit power level of the user equipment device to a maximal number of resources available to be reserved by the user equipment device. In another example, the resource reservation data structure allocates a duration of reservation per signaling based on the transmit power level of the user equipment device.

Controlling the amount of resources available for reservation by the user equipment device can comprise, according to some implementations, allocating a first quantity of resources available to be reserved by the user equipment device based on the transmit power level of the user equipment device being at a first transmit power level. Further, the operations can comprise allocating a second quantity of resources available to be reserved by the user equipment device based on the transmit power level of the user equipment device being at a second transmit power level. In addition, the operations can comprise allocating a third quantity of resources available to be reserved by the user equipment device based on the transmit power level of the user equipment device being at a third transmit power level.

In accordance with some implementations, the first transmit power level is a maximum power level, the second transmit power level is less than the maximum power level by a first percentage, and the third transmit power level is less than the maximum power level by a second percentage that is more than the first percentage. Further, the first quantity of resources available to be reserved by the user equipment device can comprise less resources than the second quantity of resources available to be reserved by the user equipment device. In addition, the third quantity of resources available to be reserved by the user equipment device can comprise more resources than the second quantity of resources available to be reserved by the user equipment device.

Another embodiment provided herein is a machine-readable storage medium, comprising executable instructions that, when executed by a processor, facilitate performance of operations. The operations can comprise establishing a resource reservation procedure that defines a group of levels. The levels of the group of levels can be based on defined transmission power level ranges and can comprise respective associated number of resources that are able to be reserved for a defined transmission power range of the defined transmission power level ranges. The operations also can comprise selecting a level from the group of levels. Selecting the level can comprise selecting a first level of the group of levels based on a first transmission power level of a mobile device being within a first defined transmission level range of the defined transmission power level ranges. Alternatively, selecting the level can comprise selecting a second level of the group of levels based on a second transmission power level of the mobile device being within a second defined transmission level range of the defined transmission power level ranges.

Establishing the resource reservation procedure can comprise defining a length of a reservation period per signaling based on the defined transmission power level ranges.

In an example, the first transmission power level is a higher transmission power level than the second transmission power level. The first level can comprise a first number of resources that can be reserved and the second level can comprise a second number of resources that can be reserved. The first number of resources can be less than the second number of resources.

According to some implementations, the resource reservation procedure is a first resource reservation procedure. Further to these implementations, the operations can comprise establishing a second resource reservation procedure based on an amount of network traffic within a communications network satisfying a defined traffic level. The second resource reservation procedure can comprise fewer reserved resources being available for the mobile device as compared to the first resource reservation procedure.

FIG. 1 illustrates an example, non-limiting, system 100 that facilitates a transmission power dependent resource reservation protocol in accordance with one or more embodiments described herein.

The system 100 can comprise a device 102 that can communicate with one or more other devices in a communications network. Aspects of systems (e.g., the system 100 and the like), apparatuses, or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the device 102 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the device 102 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 1, the device 102 can include a resource reservation manager component 104, a power component 106, an allocation component 108, traffic manager component 110, an adjustment component 112, a transmitter/receiver component 114, at least one memory 116, at least one processor 118, and at least one data store 120.

The resource reservation manager component 104 can configure the device 102 with one or more resource reservation data structures 122. To configure the device the resource reservation manager component 104 can receive an indication of the one or more resource reservation data structures 122 from, for example, a network device 124. For example, when the device 102 is to enter a defined geographic area, the device 102 (e.g., via the transmitter/receiver component 114 can receive one or more resource reservation data structures 122 associated with that defined geographic area. According to some implementations, the device (e.g., the resource reservation manager component 104) can be pre-configured with information related to the one or more resource reservation data structures 122. The one or more one or more resource reservation data structures 122 can be retained in the at least one memory 116 or the at least one data store 120, for example. In some implementations, the one or more resource reservation data structures 122 can be defined in a specification, such as a 3GPP specification.

The power component 106 can be configured to measure or determine the transmit power being utilized by the device 102. Based on the transmit power determined by the power component 106, the allocation component 108 can control the amount of resources available for reservation and can reserve resources up to that amount. The reserved resources can be used for hybrid automatic repeat request retransmission by the device 102. According to some implementations, the reserved resources can be used for initial transmission by the device 102.

If it is determined that more resources should be reserved, the power component 106 can reduce the transmit power of the device 102. Thus, if the device 102 is communicating with another device that is nearby, the device 102 can lower its transmission power according to a power control protocol. Thereafter, the device 102 can reserve more resources according to the one or more resource reservation data structures 122. In a similar manner, if the device 102 is communicating with another device that is farther away, the device 102 can use a higher transmission power and, thus, the device 102 can reserve a less amount of resources.

According to some implementations, the network (e.g., the network device 124) can adjust the effectiveness of the resource reservation procedure. For example, in a high load area, the network can configure a different table (e.g., a different resource reservation data structure of the one or more resource reservation data structures 122). The different table can allow a less amount of resources to be reserved with smaller length of reservation. Note that network can configure to disable resource reservation at some conditions (e.g. the below table, UE at Max Tx power is not allowed since the maximal reserved resource is set to 0%). Examples of resource reservation data structures are provided below with respect to FIGS. 2 and 3.

If the traffic manager component 110 determines the device 102 is in an area of high network traffic, the adjustment component 112 can adjust the values based on the different resource reservation data structure.

The transmitter/receiver component 114 can receive, from the network device 124 the indication of the one or more resource reservation data structures 122. The network (e.g., the network device 124) can configure different amount of reservation resources as well as the length of reservation per signaling to control the effectiveness of the reservation to help to prevent system congestion.

The at least one memory 116 can be operatively connected to the at least one processor 118. The at least one memory 116 can store executable instructions that, when executed by the at least one processor 118 can facilitate performance of operations. Further, the at least one processor 118 can be utilized to execute computer executable components stored in the at least one memory 116.

For example, the at least one memory 116 can store protocols associated with facilitating a transmission power dependent resource reservation protocol in an advanced network as discussed herein. Further, the at least one memory 116 can facilitate action to control communication between the device 102, the network device 124, one or more other network devices, one or more mobile devices, and so on, such that the device 102 can employ stored protocols and/or algorithms to facilitate a transmission power dependent resource reservation protocol in advanced networks as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 118 can facilitate respective analysis of information related to facilitating a transmission power dependent resource reservation protocol in advanced networks. The at least one processor 118 can be a processor dedicated to analyzing and/or generating information received, a processor that controls one or more components of the device 102, and/or a processor that both analyzes and generates information received and controls one or more components of the device 102.

Further, the term network device is used herein to refer to any type of network node serving mobile devices and/or connected to other network nodes, network elements, or another network node from which the mobile devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, a Remote Radio Unit (RRU), a Remote Radio Head (RRH), nodes in distributed antenna system (DAS), and the like.

It is noted that the network device 124 can comprise at least one memory, at least one processor, at least one data store, and/or other components, although not illustrated.

For purposes of explanation, FIG. 2 illustrates an example, non-limiting, first resource reservation data structure 200 in accordance with one or more embodiments described herein.

The first resource reservation data structure 200 (which can be included the one or more resource reservation data structures 122) can associate the maximal amount of resources reserved by one signaling with the transmission power of the device 102. In this example, the first resource reservation data structure 200 includes a first column for transmit power 202, a second column for maximal reserved resources 204, and a third column for length of reservation per signaling 206. Accordingly, the first resource reservation data structure 200 can be utilized by the resource reservation manager component 104 to limit the percentage of resources the device 102 can reserve during the defined length of time. For example, when the device 102 uses a maximum amount of its transmit power (Max Tx Power), the device 102 can reserve five percent (5%) of the resources for 50 milliseconds (50 ms). In another example, if the transmit power of the device 102 is reduced by 3 db, for example, (Max Tx Power—3 db), every reservation signaling can reserve 10% of the resources for a length of 100 ms. Other reductions in the amount of transmit power can facilitate allocation of the same or more reserved resources for the same or longer length of time, as indicated in FIG. 2. It is noted that the values in FIG. 2 are for example purposes only and other values and/or more or fewer values (e.g., rows) can be utilized according to various embodiments.

Figure 3:
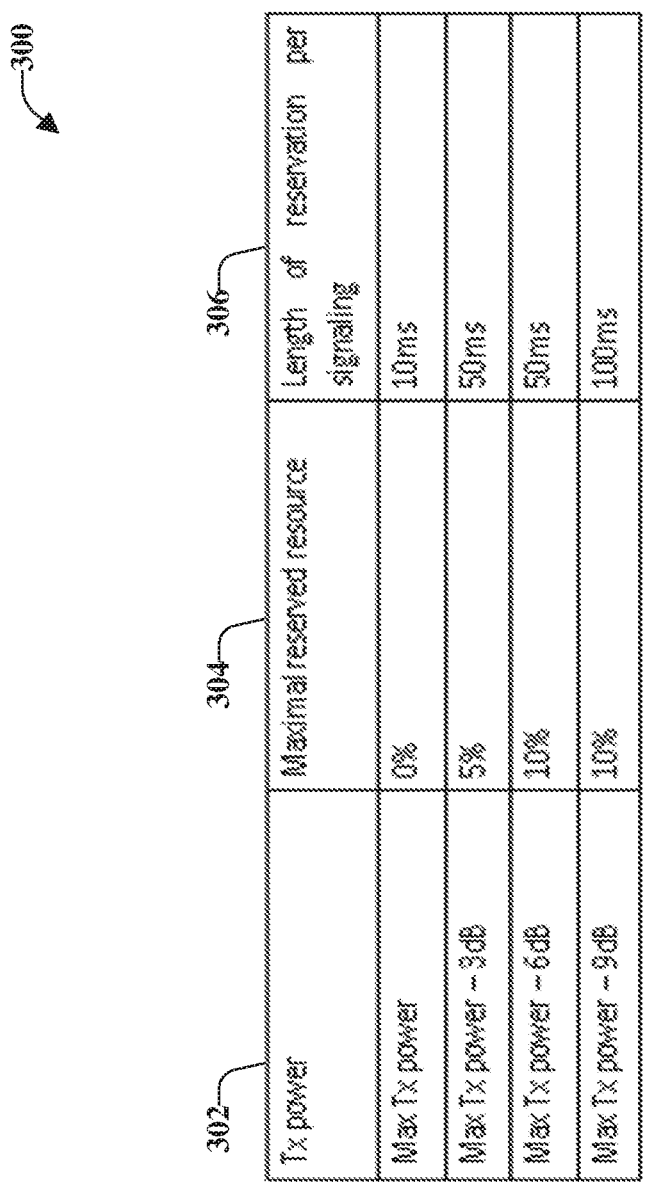
FIG. 3 illustrates an example, non-limiting, second resource reservation data structure for use in a high network load area in accordance with one or more embodiments described herein.

FIG. 3 illustrates an example, non-limiting, second resource reservation data structure 300 for use in a high network load area in accordance with one or more embodiments described herein.

The second resource reservation data structure 300 (which can be included the one or more resource reservation data structures 122) can associate the maximal amount of resource reserved by one signaling with the transmission power of the device 102 in a high network load area, which can be determined by the traffic manager component 110. In this example, the second resource reservation data structure 300 includes a first column for transmit power 302, a second column for maximal reserved resources 304, and a third column for length of reservation per signaling 306. Accordingly, the second resource reservation data structure 300 can be utilized by the resource reservation manager component 104 to limit the percentage of resources the device 102 can reserve during the length time in the high load condition, as determined by the traffic manager component 110.

For example, when the device 102 uses a maximum amount of its transmit power (Max Tx Power), the device 102 cannot reserve any resources (0%) for 10 milliseconds (10 ms). In another example, if the transmit power of the device 102 is reduced by 3 db, for example, (Max Tx Power—3 db), every reservation signaling can reserve 5% of the resources for a length of 50 ms. In yet another example, if the transmit power of the device 102 is reduced by another 3 db, for example, (Max Tx Power—6 db), every reservation signaling can reserve 10% of the resources for a length of 50 ms. Other reductions in the amount of transmit power can facilitate allocation of the same or more reserved resources for the same or a longer length of time, as indicated in FIG. 3. It is noted that the values in FIG. 3 are for example purposes only and other values and/or more or fewer values (e.g., rows) can be utilized according to various embodiments.

Figure 4:
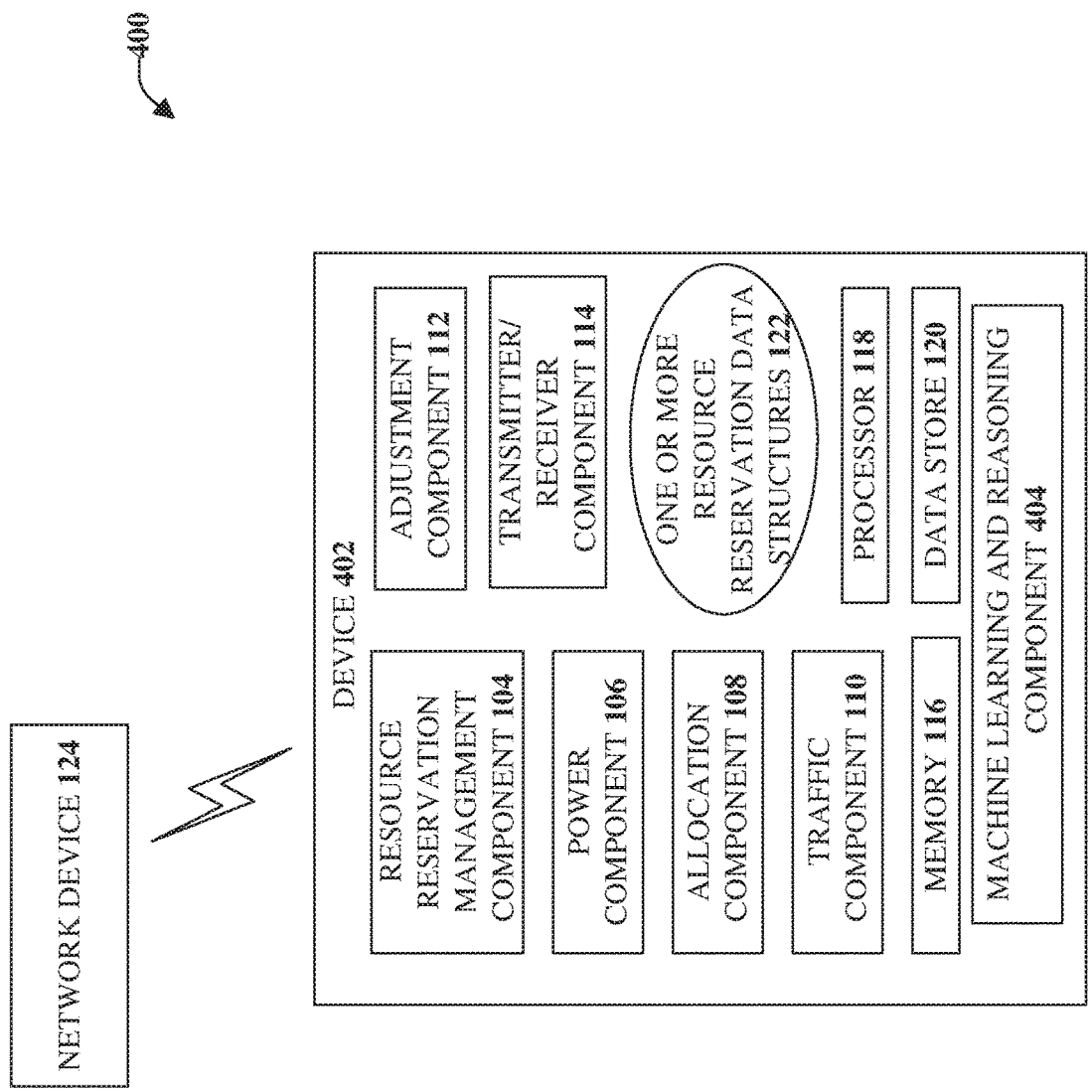
FIG. 4 illustrates an example, non-limiting, system that employs automated learning to facilitate one or more of the disclosed aspects in accordance with one or more embodiments described herein.

FIG. 4 illustrates an example, non-limiting, system 400 that employs automated learning to facilitate one or more of the disclosed aspects in accordance with one or more embodiments described herein. Repetitive description of like elements employed in other embodiments described herein is omitted for sake of brevity. The system 400 can comprise one or more of the components and/or functionality of the system 100, and vice versa.

The system 400 can comprise a device 402, which comprises a machine learning and reasoning component 404 that can be utilized to automate one or more of the disclosed aspects. The machine learning and reasoning component 404 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 404 can employ principles of probabilistic and decision theoretic inference. Additionally, or alternatively, the machine learning and reasoning component 404 can rely on predictive models constructed using machine learning and/or automated learning procedures. Logic-centric inference can also be employed separately or in conjunction with probabilistic methods.

The machine learning and reasoning component 404 can infer whether a device can reduce a transmission power and the benefits gained by reducing the transmission power. For example, if the device 402 is communicating with one or more other devices that are a defined distance away from the device 402, the device 402 might need to use its maximum transmit power, or a value close to its maximum transmit power. Therefore, it might be inferred by the machine learning and reasoning component 404 that any benefit received (e.g., reserving more resources) would be offset by degradation of the communication signal with the one or more other devices.

Further, the machine learning and reasoning component 404 can infer the network traffic load in a defined geographic area (e.g., the geographic area where the device 402 is located). If the network traffic load satisfies a defined network threshold level it can indicate that the network is congested and a different resource reservation data structure (e.g., the second resource reservation data structure 300) should be used.

As used herein, the term "inference" refers generally to the process of reasoning about or inferring states of a system, a component, a module, an environment, and/or devices from a set of observations as captured through events, reports, data and/or through other forms of communication. Inference can be employed to identify a specific condition, modification, and/or effect, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with facilitating a transmission power dependent resource reservation procedure in advanced networks) can employ various artificial intelligence-based schemes for carrying out various aspects thereof. For example, a process for determining which resource reservation data structure should be selected from one or more resource reservation data structures 122 for use by the device.

A classifier is a function that maps an input attribute vector, x=(x1, x2, x3, x4, xn), to a confidence that the input belongs to a class. In other words, f(x)=confidence(class). Such classification can employ a probabilistic and/or statistical-based analysis (e.g., factoring into the analysis utilities and costs) to provide a prognosis and/or infer one or more actions that should be employed to determine what action to be automatically performed.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by retaining a database of triggers, historical changes, and impacts). For example, SVMs can be configured through a learning or training phase within a classifier constructor and feature selection module. Thus, a classifier(s) can be used to automatically learn and perform a number of functions, including but not limited to facilitating a transmission power dependent resource reservation procedure in advanced networks.

Methods that can be implemented in accordance with the disclosed subject matter will be better appreciated with reference to various flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 5:
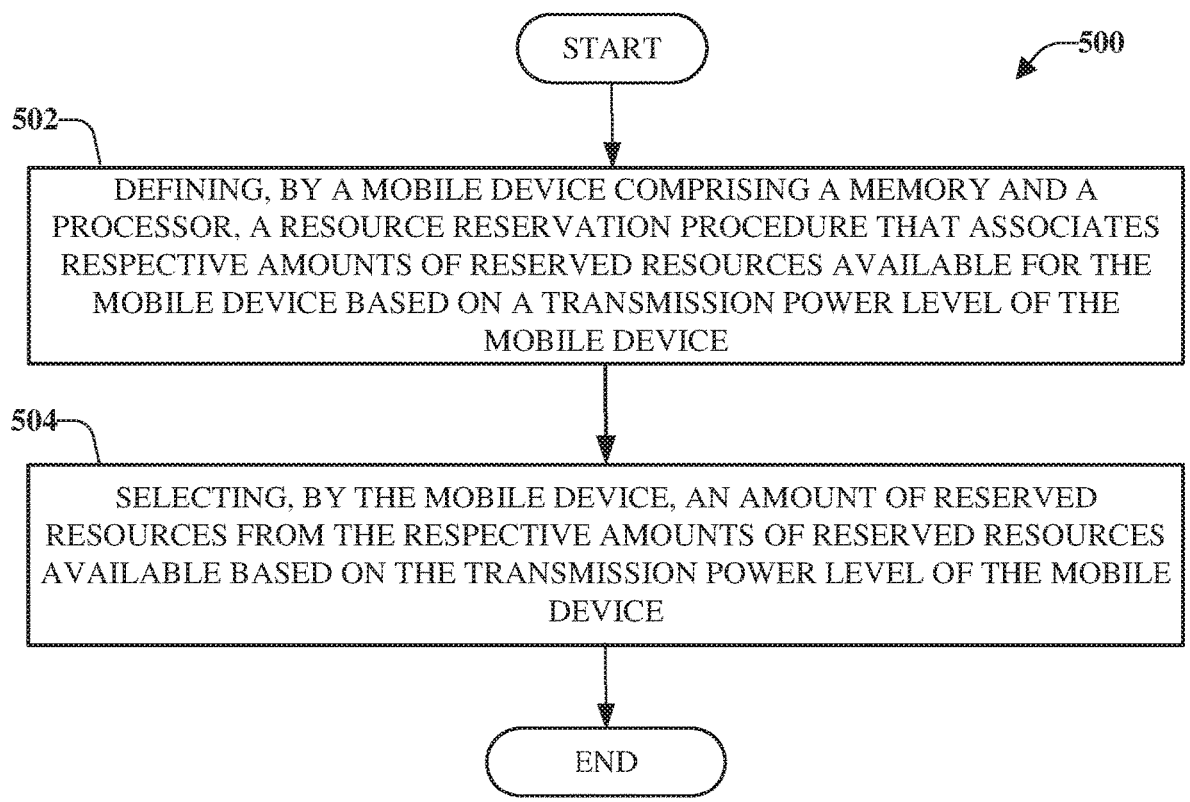
FIG. 5 illustrates a flow diagram of an example, non-limiting, computer-implemented method for facilitating a transmission power dependent resource reservation protocol in advanced networks in accordance with one or more embodiments described herein.

FIG. 5 illustrates a flow diagram of an example, non-limiting, computer-implemented method 500 for facilitating a transmission power dependent resource reservation protocol in advanced networks in accordance with one or more embodiments described herein. Repetitive description of like elements employed in other embodiments described herein is omitted for sake of brevity.

In some implementations, a system comprising a processor can perform the computer-implemented method 500 and/or other methods discussed herein. In other implementations, a device comprising a processor can perform the computer-implemented method 500 and/or other methods discussed herein. In other implementations, a machine-readable storage medium, can comprise executable instructions that, when executed by a processor, facilitate performance of operations, which can be the operations discussed with respect to the computer-implemented method 500 and/or other methods discussed herein. In further implementations, a machine readable or computer readable storage device comprising executable instructions that, in response to execution, cause a system comprising a processor to perform operations, which can be operations discussed with respect to the computer-implemented method 500 and/or other methods discussed herein.

The computer-implemented method 500 starts at 502 with defining, by a mobile device comprising a memory and a processor, a resource reservation procedure that associates respective amounts of reserved resources available for the mobile device based on a transmission power level of the mobile device (e.g., via the resource reservation manager component 104). The computer-implemented method 500 continues at 504 with selecting, by the mobile device, an amount of reserved resources from the respective amounts of reserved resources available based on the transmission power level of the mobile device (e.g., via the allocation component 108).

For example, the amount of reserved resources can be associated with the transmission power. For device's (e.g., UE device's) communicating with a close by device (e.g., UE device), a lower transmission power can be used according to the power control protocol thus more resources are available to be reserved. Similarly, for a device (e.g., UE device) communicating with a faraway device (e.g., UE device), higher transmission power is used thus there less resources are available to be reserved. Accordingly, the network can configure a different amount of reservation resource as well as the length of reservation per signaling to control the effectiveness of the reservation to help to prevent system congestion.

Figure 6:
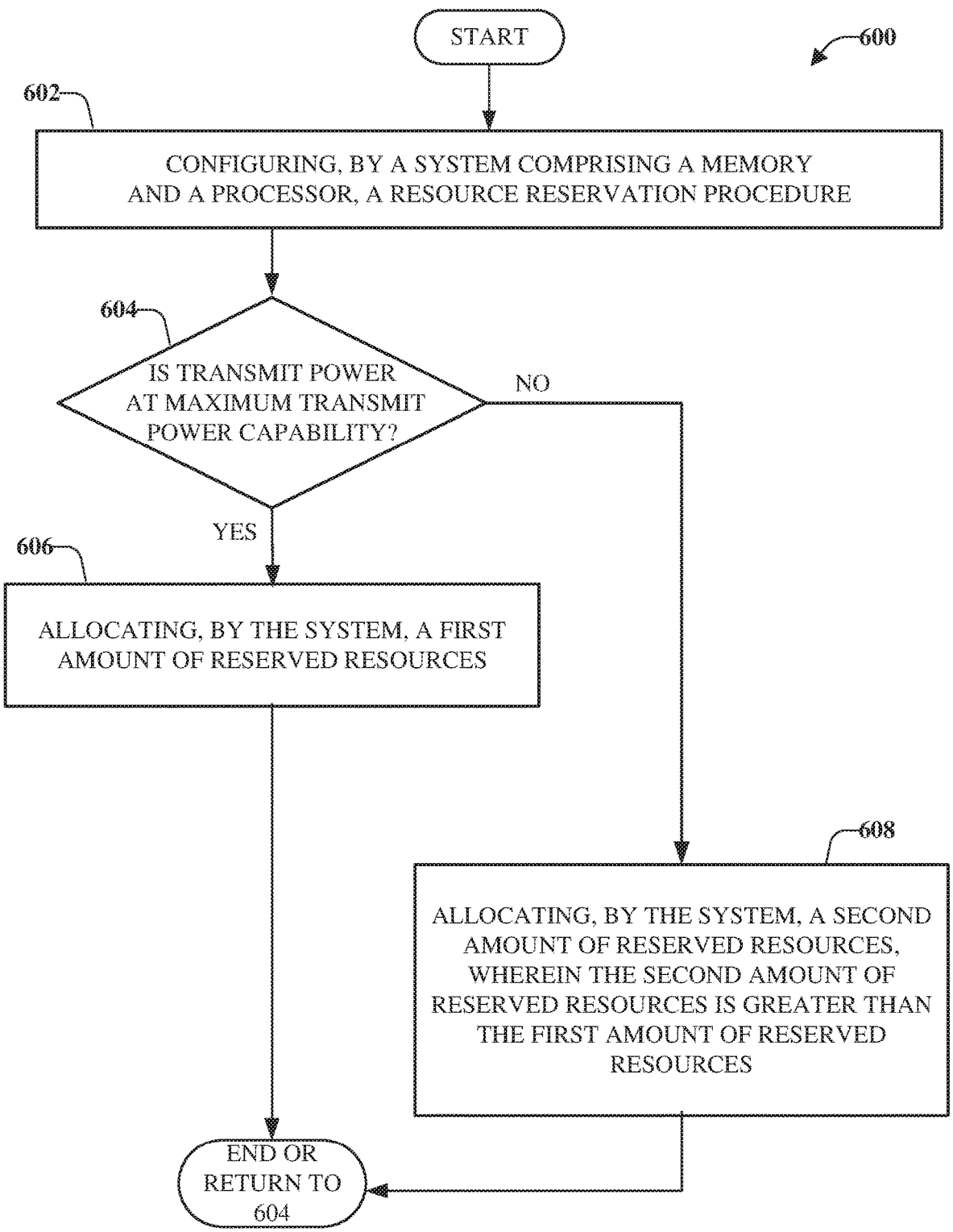
FIG. 6 illustrates a flow diagram of an example, non-limiting, computer-implemented method for facilitating a transmission power dependent resource reservation protocol in advanced networks in accordance with one or more embodiments described herein.

FIG. 6 illustrates a flow diagram of an example, non-limiting, computer-implemented method 600 for facilitating a transmission power dependent resource reservation protocol in advanced networks in accordance with one or more embodiments described herein. Repetitive description of like elements employed in other embodiments described herein is omitted for sake of brevity.

At 602, a resource reservation procedure can be configured (e.g., via the resource reservation manager component 104). For example, the resource reservation procedure can associate respective amounts of reserved resources available for the mobile device based on a transmission power level of the mobile device. To configure the resource reservation, at 604 a determination can be made whether the transmit power used by the device is a maximum transmit power capability of the mobile device (e.g., via the power component 106). If it is at the maximum transmit power capability ("YES"), at 606 a first amount of reserved resources can be allocated (e.g., via the allocation component 108).

If the determination at 604 is that the transmit power used by the device is not at the maximum transmit power capability of the mobile device ("NO"), at 608, a second amount of reserved resources can be allocated (e.g., via the allocation component 108). The second amount of reserved resources can be greater than the first amount of reserved resources.

After the allocating at 606 and/or the allocating at 608, the computer-implemented method 600 can end, or can return to 604 with another determination related to a current transmit power of the device. For example, configuring the resource reservation procedure at 604 can comprise defining a length of a reservation period per signaling based on the transmission power level of the mobile device.

Figure 7:
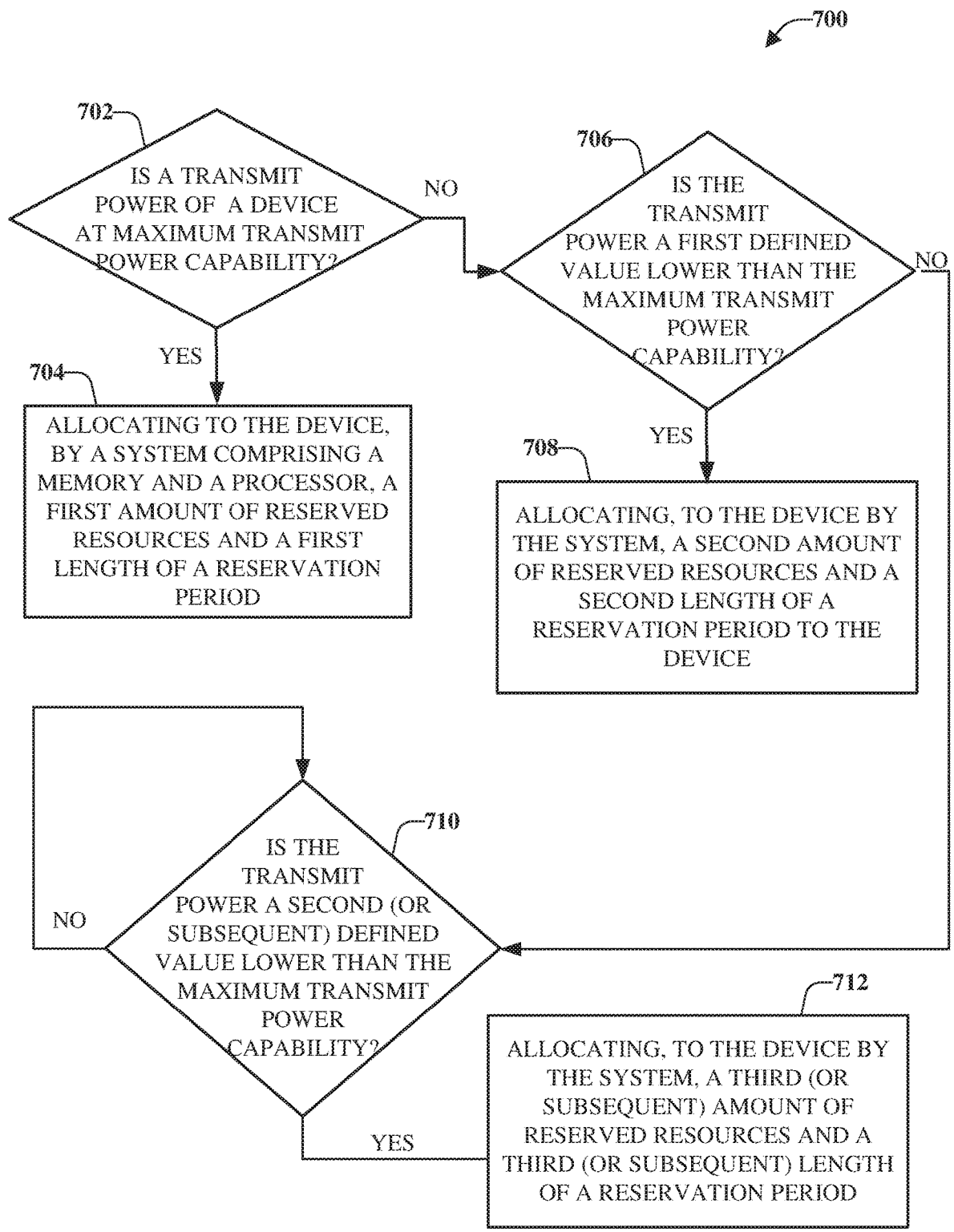
FIG. 7 illustrates a flow diagram of an example, non-limiting, computer-implemented method for allocating an amount of resources available to be reserved based on a transmission power dependent resource reservation protocol in advanced networks in accordance with one or more embodiments described herein.

FIG. 7 illustrates a flow diagram of an example, non-limiting, computer-implemented method 700 for allocating an amount of resources available to be reserved based on a transmission power dependent resource reservation protocol in advanced networks in accordance with one or more embodiments described herein. Repetitive description of like elements employed in other embodiments described herein is omitted for sake of brevity.

At 702, a determination can be made whether a transmit power used by a device is a maximum transmit power capability of the mobile device (e.g., via the power component 106). Although not illustrated, another determination can be made related to an amount of network traffic within a communications network. If the amount satisfies a defined network traffic level, the computer implemented method of FIG. 8 can be utilized.

If the device is using (or decides to use) its maximum transmit power capability ("YES"), at 704, a first amount of reserved resources and a first length of a reservation period can be allocated to the device (e.g., via the allocation component 108). For example, the first amount and the first length can be based a resource reservation data structure (e.g., the resource reservation data structure 200, the resource reservation data structure 300, or another data structure).

If it is determined at 702 that the maximum transmit power capability is not being used (or scheduled to be used) by the device, at 706, a determination can be made whether the transmit power level of the device is at least a first defined value lower, but not more than a second defined value lower, than the maximum transmit power capability (e.g., via the power component 106). It is noted that if the transmit power level is lower than the maximum power level capability, but does not satisfy a first defined value (e.g., is more than the first defined value), the first amount of reserved resources and the first length of a reservation period can be allocated to the device (at 704).

If the transmit power value is determined, at 706, to be at least the first defined value lower, but not more than a second defined value lower ("YES"), at 708, a second amount of reserved resources and a second length of a reservation period can be allocated to the device (e.g., via the allocation component 108). According to some implementations, the second amount of reserved resources can be a same amount as the first amount of reserved resources, or can be a different amount, for example, the second amount of reserved resources can comprise more resources than the first amount of reserved resources. In additional, or alternative, implementations, the second length of the reservation period can be the same length as the first length of the reservation period, or can be a different length (e.g., a longer length of time) than the first length of the reservation period.

If the transmit power value is determined, at 706, to be more than the first defined value lower, but not more than a second defined value lower, than the maximum transmit power capability of the device ("NO"), at 710, another determination can be made whether the transmit power level of the device is at least a second defined value lower, but not more than a third defined value lower, than the maximum transmit power capability.

If the determination at 710 is that the transmit power level of the device is at least the second defined value lower than the maximum power level capability, but not more than the third defined value lower ("YES"), at 712, a third amount of reserved resources and a third length of a reservation period can be allocated to the device (e.g., via the allocation component 108). The third amount of reserved resources can be equal to or greater than the second amount of reserved resources. Alternatively, or additionally, the third length of the reservation period can be equal to or greater than the second length of the reservation period.

It is noted that if the transmit power level is lower than the first defined value, but does not satisfy the second defined value, the second amount of reserved resources and the second length of a reservation period can be allocated to the device (at 708).

If, at 710, the transmit power value is determined to be more than the second defined value lower than the maximum transmit power capability of the device ("NO"), the computer-implemented method 700 can return to 710 and another determination can made whether the transmit power level of the device is a third (or subsequent (e.g., fourth, fifth, sixth, and so on)) defined value lower, but not more than a fourth (or subsequent (e.g., fifth, sixth, seventh, and so on)) defined value lower, than the maximum transmit power capability. Based on the results of the determination, subsequent amounts of reserved resources and subsequent lengths of the reservation period can be allocated to the device as determined based on the one or more resource reservation data structures 122. The subsequent amount of reserved resources can be equal to or greater than the second amount of reserved resources. Alternatively, or additionally, the subsequent length of the reservation period can be equal to or greater than the second length of the reservation period.

It is to be understood that the determination of the subsequent values at 710 can be recursive and is dependent on the values provided in the one or more resource reservation data structures 122. For example, if the resource reservation data structure being utilized has two levels, only two determinations are made. If the resource reservation data structure being utilized has five levels, five determinations are made, and so on.

Further, after expiration of the length of a reservation period or after another defined interval, the computer-implemented method 700 can return to 702 with another determination whether a transmit power used by a device is a maximum transmit power capability of the mobile device.

Figure 8:
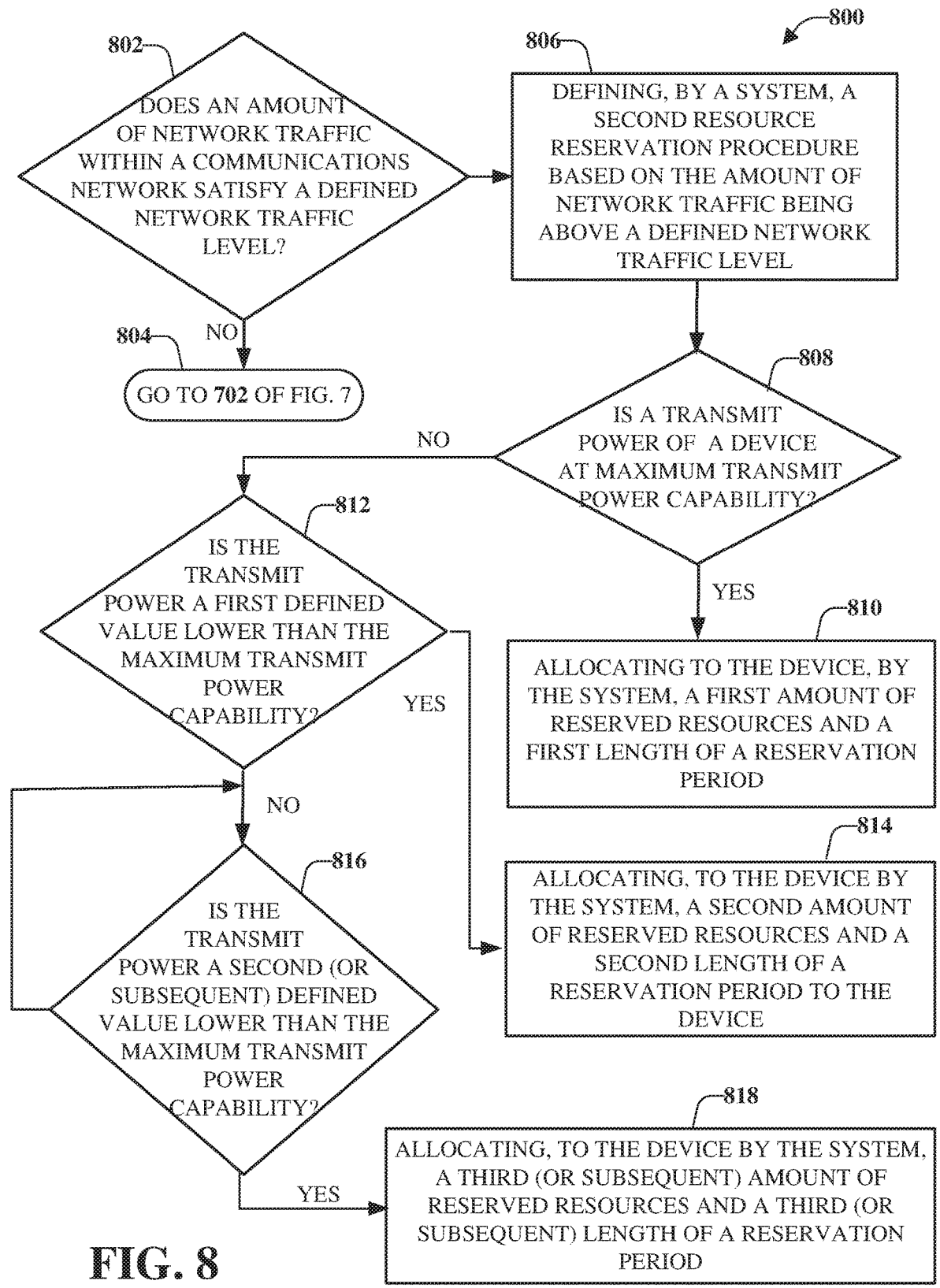
FIG. 8 illustrates a flow diagram of an example, non-limiting, computer-implemented method for allocating an amount of resources available to be reserved in a high network load environment in accordance with one or more embodiments described herein.

FIG. 8 illustrates a flow diagram of an example, non-limiting, computer-implemented method 800 for allocating an amount of resources available to be reserved in high network load environment in accordance with one or more embodiments described herein. Repetitive description of like elements employed in other embodiments described herein is omitted for sake of brevity.

The computer-implemented method 800 starts, at 802, when a system comprising a processor and a memory can determine whether an amount of network traffic within a communications network satisfies a defined network traffic level (e.g., via the traffic manager component 110). For example, the defined network traffic level can be a level determined to cause a high load area of the communications network.

If the amount of network traffic does not satisfy the defined network traffic level ("NO"), the computer-implemented method 800 can, at 804, return to 702 of FIG. 7. However, if the amount of network traffic is determined to satisfy the defined network traffic level ("YES"), at 806, a second resource reservation procedure can be defined, where the first resource reservation procedure is the procedure discussed with respect to FIG. 7 (e.g., via the adjustment component 112).

Although discussed with respect to defining the second resource reservation procedure, the procedure can be pre-configured at the device, can be defined in one or more communications standards, or can be provided to the device in another manner.

It is noted that in some implementations, the second resource reservation procedure can comprise fewer reserved resources being available for the mobile device as compared to the first resource reservation procedure. However, the disclosed aspects are not limited to this implementation and the second resource reservation procedure and/or subsequent resource reservation procedures can comprises the same, similar, or reserved resources being available and/or lengths.

The computer-implemented method 800 continues, at 808, and a determination can be made whether a transmit power used by a device is a maximum transmit power capability of the mobile device (e.g., via the power component 106). If the device is using (or decides to use) its maximum transmit power capability ("YES"), at 810 a first amount of reserved resources and a first length of a reservation period can be allocated to the device, based on the second resource reservation procedure.

If it is determined at 808 that the maximum transmit power capability is not being used (or scheduled to be used) by the device ("NO"), at 812, a determination can be made whether the transmit power level of the device is a first defined value lower, but not more than a second defined value lower, than the maximum transmit power capability (e.g., via the power component 106). If the value is the first defined value lower, but not more than the second defined value lower, ("YES"), at 814, a second amount of reserved resources and a second length of a reservation period can be allocated to the device, based on the second resource reservation procedure (e.g., via the allocation component 108).

It is noted that if the transmit power level is lower than the maximum power level capability, but does not satisfy the first defined value, the first amount of reserved resources and the first length of a reservation period can be allocated to the device (at 810).

If the value of the transmit power level is determined to be more than the first defined value lower than the maximum transmit power capability of the device ("NO"), at 816, another determination can be made whether the transmit power level of the device is a second defined value lower, but not more than a third defined value lower, than the maximum transmit power capability (e.g., via the power component 106).

If the determination at 816 is that the transmit power level is at least the second defined value lower than the maximum power level capability, but not more than the third defined value lower ("YES"), at 818, a third amount of reserved resources and a third length of a reservation period can be allocated to the device, based on the second resource reservation procedure (e.g., via the allocation component 108).

It is noted that if the transmit power level is lower than the first defined value, but does not satisfy the second defined value, the second amount of reserved resources and the second length of a reservation period can be allocated to the device (at 814). The second amount of reserved resources can be equal to or greater than the first amount of reserved resources. Alternatively, or additionally, the second length of the reservation period can be equal to or greater than the first length of the reservation period.

If the value is determined to be more than the second defined value lower than the maximum transmit power capability of the device ("NO"), the computer-implemented method 800 can return to 816 and another determination can made whether the transmit power level of the device is a third (or subsequent) defined value lower, but not more than a fourth (or subsequent) defined value lower than the maximum transmit power capability (e.g., via the power component 106). Based on the results of the determination, subsequent amounts of reserved resources and subsequent lengths of the reservation period can be allocated to the device, based on the second resource reservation procedure. The subsequent amount of reserved resources can be equal to or greater than the second amount of reserved resources. Alternatively, or additionally, the subsequent length of the reservation period can be equal to or greater than the second length of the reservation period.

It is to be understood that the determination of the subsequent values at 816 can be recursive and is dependent on the values provided in the one or more resource reservation data structures 122. For example, if the resource reservation data structure being utilized has three levels, only three determinations are made. If the resource reservation data structure being utilized has six levels, six determinations are made, and so on.

Further, after expiration of the length of a reservation period or after another defined interval, the computer-implemented method 800 can return to 802 with another determination whether an amount of network traffic within a communications network satisfies a defined network traffic level.

Described herein are systems, methods, articles of manufacture, and other embodiments or implementations that can facilitate a transmission power dependent resource reservation protocol networks. Facilitating a transmission power dependent resource reservation protocol in advanced networks can be implemented in connection with any type of device with a connection to the communications network (e.g., a mobile handset, a computer, a handheld device, etc.) any Internet of things (IoT) device (e.g., toaster, coffee maker, blinds, music players, speakers, water meter, etc.), and/or any connected vehicles (e.g., cars, airplanes, boats, space rockets, and/or other at least partially automated vehicles (e.g., drones), and so on). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

To meet the huge demand for data centric applications, 4G standards can be applied to 5G, also called New Radio (NR) access. The 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to Long Term Evolution (LTE).

Multiple Input, Multiple Output (MIMO) systems can significantly increase the data carrying capacity of wireless systems. For these reasons, MIMO is an integral part of the third and fourth generation wireless systems (e.g., 3G and 4G). In addition, 5G systems also employ MIMO systems, which are referred to as massive MIMO systems (e.g., hundreds of antennas at the transmitter side (e.g., network) and/receiver side (e.g., user equipment). With a $(N_t, N_r)$ system, where $N_t$ denotes the number of transmit antennas and Nr denotes the receive antennas, the peak data rate multiplies with a factor of $N_t$ over single antenna systems in rich scattering environment.

In addition, advanced networks, such as a 5G network can be configured to provide more bandwidth than the bandwidth available in other networks (e.g., 4G network, 5G network). A 5G network can be configured to provide more ubiquitous connectivity. In addition, more potential of applications and services, such as connected infrastructure, wearable computers, autonomous driving, seamless virtual and augmented reality, "ultra-high-fidelity" virtual reality, and so on, can be provided with 5G networks. Such applications and/or services can consume a large amount of bandwidth. For example, some applications and/or services can consume about fifty times the bandwidth of a high-definition video stream, Internet of Everything (IoE), and others. Further, various applications can have different network performance requirements (e.g., latency requirements and so on).

Cloud Radio Access Networks (cRAN) can enable the implementation of concepts such as SDN and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 9:
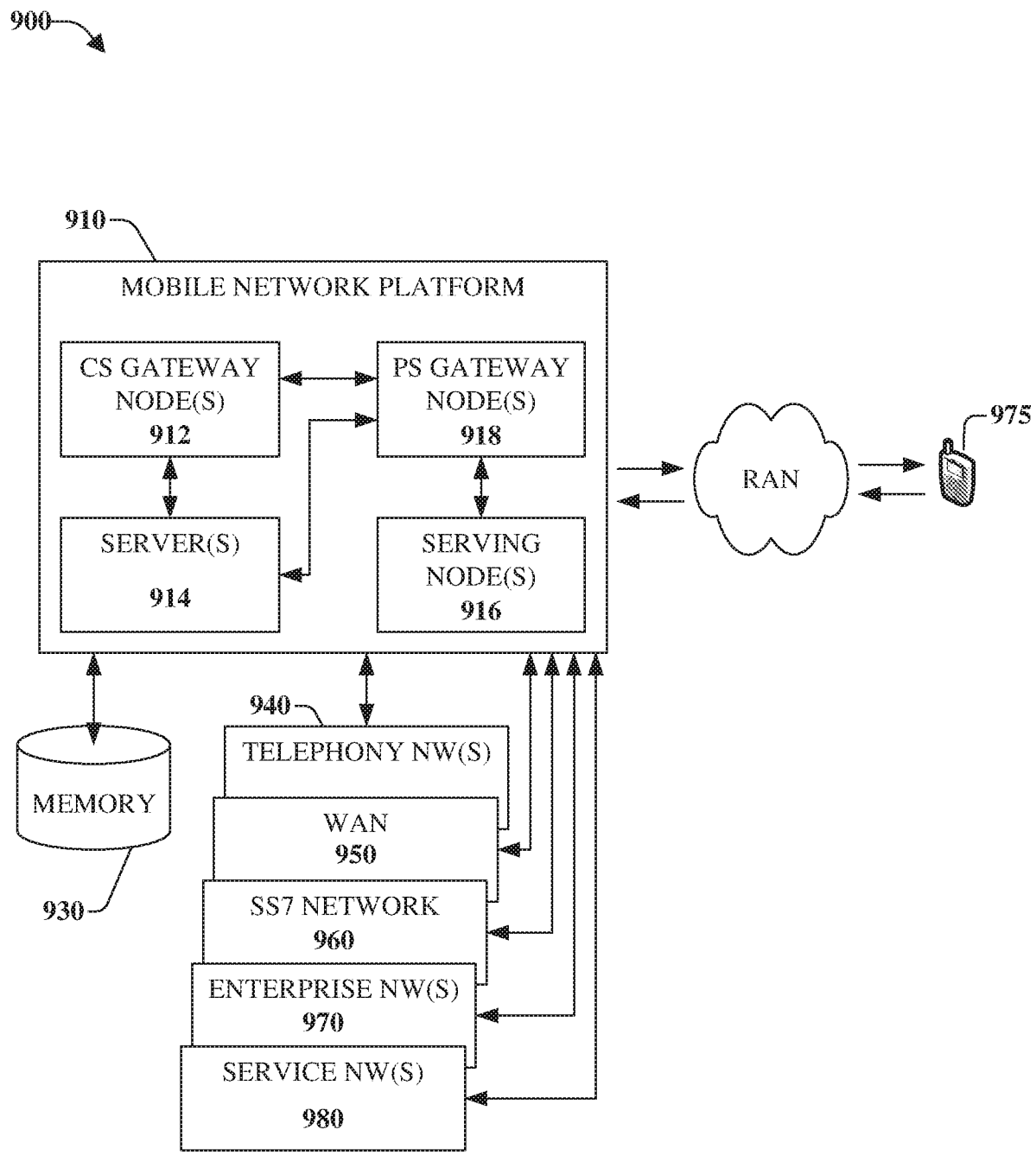
FIG. 9 illustrates an example block diagram of a non-limiting embodiment of a mobile network platform in accordance with various aspects described herein.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., Internet protocol (IP), frame relay, asynchronous transfer mode (ATM) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks such as telephony network(s) 940 (e.g., public switched telephone network (PSTN), or public land mobile network (PLMN)) or a signaling system #7 (SS7) network 960. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication. Mobile network platform 910 can also include the MMEs, HSS/PCRFs, SGWs, and PGWs disclosed herein.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) such as IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format, and so on) such flows. Such application(s) can include add-on features to standard services (for example, provisioning, billing, user support, and so forth) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless network platform 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
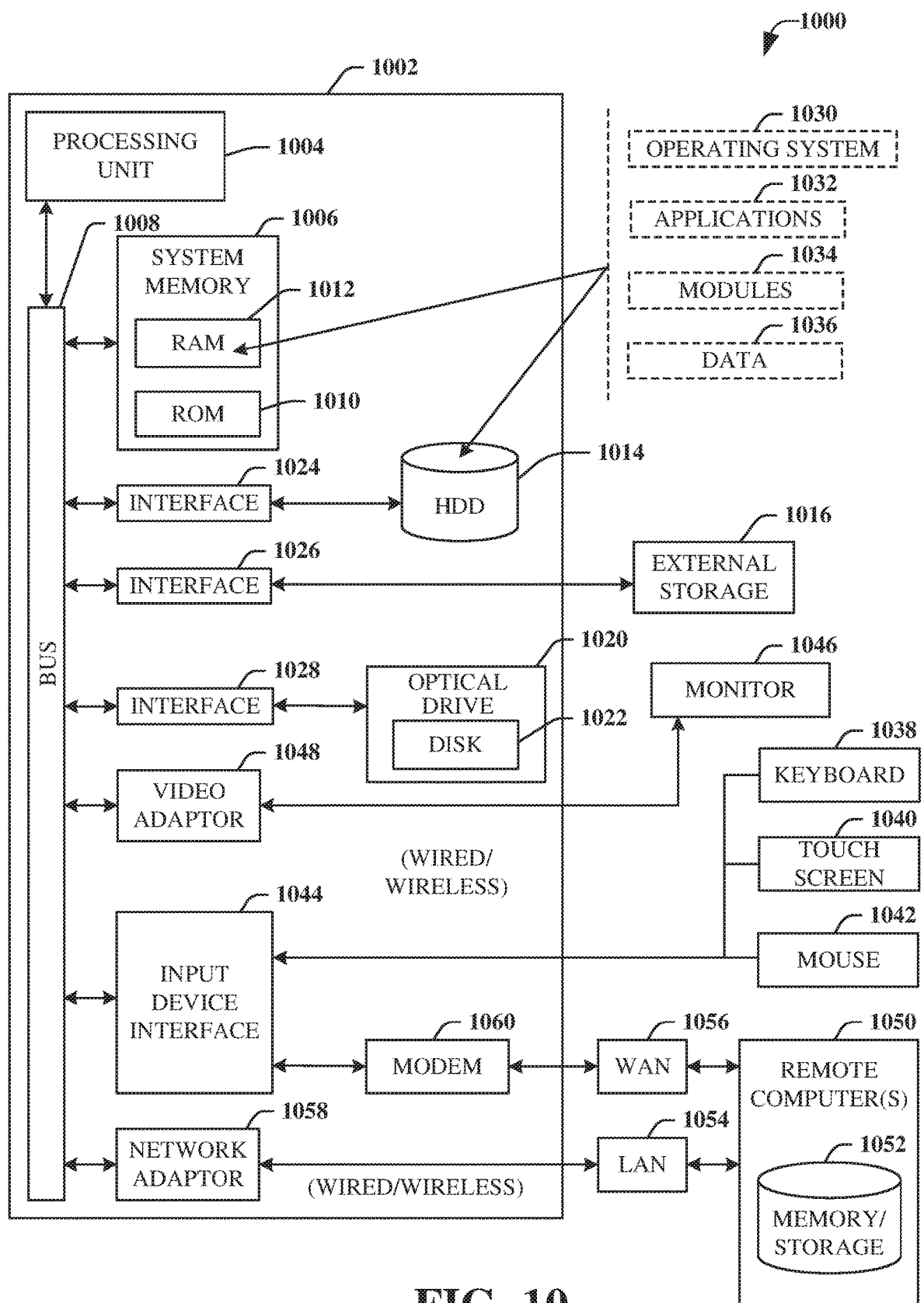
FIG. 10 illustrates an example block diagram of an example computer operable to engage in a system architecture that facilitates wireless communications according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an internal HDD 1014. The internal HDD 1014, external storage device(s) 1016 and optical disk drive 1020 can be connected to the system bus 1008 by an HDD interface 1024, an external storage interface 1026 and an optical drive interface 1028, respectively. The HDD interface 1024 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for application programs 1032. Runtime environments are consistent execution environments that allow application programs 1032 to run on any operating system that includes the runtime environment. Similarly, operating system 1030 can support containers, and application programs 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1060, and a pointing device, such as a mouse 1062. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1064 that can be coupled to the system bus 1008, but can be connected by other interfaces, such as a parallel port, an IEEE 1094 serial port, a game port, a USB port, an IR interface, a BLUETOOTH® interface, etc.

A monitor 1066 or other type of display device can be also connected to the system bus 1008 via an interface, such as a video adapter 1068. In addition to the monitor 1066, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1080 or can be connected to a communications server on the WAN 1056 via other means for establishing communications over the WAN 1056, such as by way of the Internet. The modem 1080, which can be internal or external and a wired or wireless device, can be connected to the system bus 1008 via the input device interface 1064. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1080, respectively. Upon connecting the computer 1002 to an associated cloud storage system, the external storage interface 1026 can, with the aid of the adapter 1058 and/or modem 1080, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, Wireless Fidelity (Wi-Fi), Global System For Mobile Communications (GSM), Universal Mobile Telecommunications System (UMTS), Worldwide Interoperability For Microwave Access (WiMAX), enhanced General Packet Radio Service (enhanced GPRS), Third Generation Partnership Project (3GPP) long term evolution (LTE), Third Generation Partnership Project 2 (3GPP2) Ultra Mobile Broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   defining, by a system comprising a memory and a processor, a resource reservation procedure that associates respective amounts of reserved resources available for a mobile device based on a transmission power level of the mobile device; and
   selecting, by the system, an amount of reserved resources from the respective amounts of reserved resources available based on the transmission power level of the mobile device, wherein the amount of reserved resources comprises a first amount of reserved resources, a second amount of reserved resources, and a third amount of reserved resources, wherein the selecting comprises:
      allocating the first amount of reserved resources based on the transmission power level of the mobile device being determined to be at a maximum transmission power capability of the mobile device;
      allocating the second amount of reserved resources based on the transmission power level of the mobile device being determined to be a first defined value lower than the maximum transmission power capability of the mobile device, and
      allocating the third amount of reserved resources based on the transmission power level of the mobile device being determined to be a second defined value lower than the maximum transmission power capability of the mobile device,
   wherein the first amount of reserved resources comprises less resources than the second amount of reserved resources, and wherein the third amount of reserved resources comprises more resources than the second amount of reserved resources.

2. The method of claim 1, wherein the defining comprises defining a length of a reservation period per signaling based on the transmission power level of the mobile device.

3. The method of claim 2, wherein the defining of the length of the reservation period comprises:
   defining a first length of the reservation period based on the transmission power level being determined to be at the maximum transmission power capability of the mobile device; and
   defining a second length of the reservation period based on the transmission power level being determined to be a second defined percentage lower than the maximum transmission power capability of the mobile device, wherein the second length of the reservation period is longer than the first length of the reservation period.

4. The method of claim 1, wherein the reserved resources are used for initial transmission by the mobile device.

5. The method of claim 1, wherein the reserved resources are used for hybrid automatic repeat request retransmission by the mobile device.

6. The method of claim 1, wherein the resource reservation procedure is a first resource reservation procedure, and wherein the method further comprises:
   determining, by the system, an amount of network traffic within a communications network, and
   defining, by the system, a second resource reservation procedure based on the amount of network traffic being above a defined network traffic level.

7. The method of claim 6, wherein the second resource reservation procedure comprises fewer reserved resources being available for the mobile device as compared to the first resource reservation procedure.

8. The method of claim 6, wherein the defining of the second resource reservation procedure further comprises defining a first length of a first reservation period per signaling based on the transmission power level of the mobile device, and wherein the first length of the first reservation period of the second resource reservation procedure is shorter than a second length of a second reservation period of the first resource reservation procedure.

9. The method of claim 6, wherein the defining of the second resource reservation procedure comprises disabling a reservation of resources based on the transmission power level of the mobile device being a maximum transmission power level of the mobile device.

10. The method of claim 1, further comprising
mitigating, by the system, an amount of network traffic congestion in a communications network, the mitigating comprising controlling an effectiveness of the amount of reserved resources based on the defining the resource reservation procedure.

11. A system, comprising:
a processor; and
a memory that stores executable instructions that, when executed by the processor, facilitate performance of operations, comprising:
configuring a user equipment device with a resource reservation data structure; and
controlling an amount of resources available for reservation by the user equipment based on a transmission power level of the user equipment during a reservation signaling duration and based on the resource reservation data structure, wherein the amount of resources available for reservation by the user equipment comprises a first quantity of resources, a second quantity of resources, and a third quantity of resources, and wherein the controlling comprises:
allocating the first quantity of resources based on the transmission power level of the user equipment being at a first transmission power level,
allocating the second quantity of resources based on the transmission power level of the user equipment being at a second transmission power level, and
allocating the third quantity of resources based on the transmission power level of the user equipment being at a third transmission power level, wherein the first transmission power level is a maximum power level of the user equipment, the second transmission power level is less than the maximum power level by a first percentage, and the third transmission power level is less than the maximum power level by a second percentage that is more than the first percentage, wherein the first quantity of resources comprises less resources than the second quantity of resources, and wherein the third quantity of resources comprises more resources than the second quantity of resources.

12. The system of claim 11, wherein the resource reservation data structure maps the transmission power level of the user equipment to a maximal number of resources available to be reserved by the user equipment.

13. The system of claim 12, wherein the resource reservation data structure allocates a duration of reservation per signaling based on the transmission power level of the user equipment.

14. The system of claim 11, wherein the resource reservation data structure is a first resource reservation data structure, and wherein the operations further comprise:
determining an amount of network traffic within a communications network, and
defining a second resource reservation data structure based on the amount of network traffic being above a defined network traffic level.

15. The system of claim 14, wherein the second resource reservation data structure comprises fewer reserved resources being available for the user equipment as compared to the first resource reservation data structure.

16. The system of claim 14, wherein the defining comprises defining a first length of a first reservation period per signaling based on the transmission power level of the user equipment, and wherein the first length of the first reservation period of the second resource reservation data structure is shorter than a second length of a second reservation period of the first resource reservation data structure.

17. The system of claim 14, wherein the defining comprises disabling a reservation of resources based on the transmission power level of the user equipment being the maximum power level.

18. The system of claim 11, wherein the operations further comprise:
mitigating an amount of network traffic congestion in a communications network, the mitigating comprising controlling an effectiveness of the amount of resources available for reservation by the user equipment based on the configuring the resource reservation data structure.

19. A non-transitory machine-readable medium, comprising executable instructions that, when executed by a processor, facilitate performance of operations, comprising:
defining a resource reservation procedure that associates respective amounts of reserved resources available for a user equipment based on a transmission power level of the user equipment;
selecting an amount of reserved resources from the respective amounts of reserved resources available based on the transmission power level of the user equipment, wherein the amount of reserved resources comprises a first amount of reserved resources, a second amount of reserved resources, and a third amount of reserved resources, wherein the third amount of reserved resources comprises more resources than the second amount of reserved resources, and wherein the second amount of reserved resources comprises more resources than the first amount of reserved resources, wherein the selecting comprises:
allocating the first amount of reserved resources based on the transmission power level of the user equipment being determined to be at a first transmission power level;
allocating the second amount of reserved resources based on the transmission power level of the user equipment being determined to be at a second transmission power level; and
allocating the third amount of reserved resources based on the transmission power level of the user equipment being determined to be at a third transmission power level, wherein the first transmission power level is representative of an upper limit on the transmission power level applicable to the user equipment, the second transmission power level is less than the upper limit on the transmission power level by a first percentage, and the third transmission power level is less than the upper limit on the transmission power level by a second percentage that is more than the first percentage.

20. The non-transitory machine-readable medium of claim 19, wherein the operations further comprise:
mitigating an amount of network traffic congestion in a communications network, wherein the mitigating comprises controlling an effectiveness of the amount of reserved resources based on the defining the resource reservation procedure.

* * * * *